W. L. SMITH.
TIRE CHAIN.
APPLICATION FILED APR. 6, 1917.

1,258,823.

Patented Mar. 12, 1918.

INVENTOR
W. L. Smith,
BY
ATTORNEY

UNITED STATES PATENT OFFICE.

WALTER L. SMITH, OF NEW YORK, N. Y.

TIRE-CHAIN.

1,258,823. Specification of Letters Patent. Patented Mar. 12, 1918.

Application filed April 6, 1917. Serial No. 160,078.

*To all whom it may concern:*

Be it known that I, WALTER L. SMITH, a citizen of the United States, residing at New York, in the county of New York and State of New York, have invented certain new and useful Improvements in Tire-Chains, of which the following is a full, clear, and exact description, such as will enable others skilled in the art to which it appertains to make and use the same.

This invention relates to tire chains, or similar devices, employed to prevent automobile skidding.

The primary object of the invention is to provide a reliable and efficient device of the character mentioned and improved in respects which facilitate its application to vehicle wheels without elevating or rotating the latter.

Figure 1:
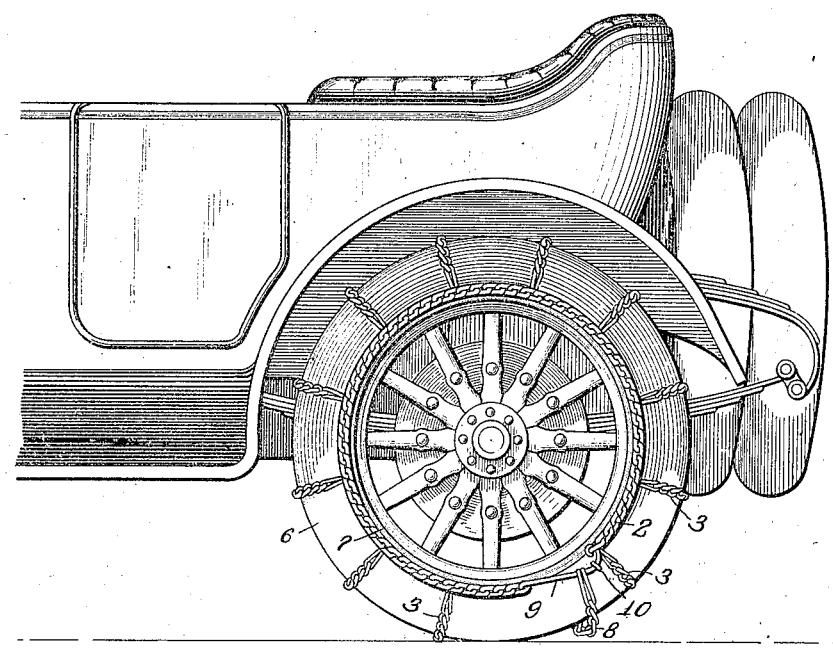
Figure 2:
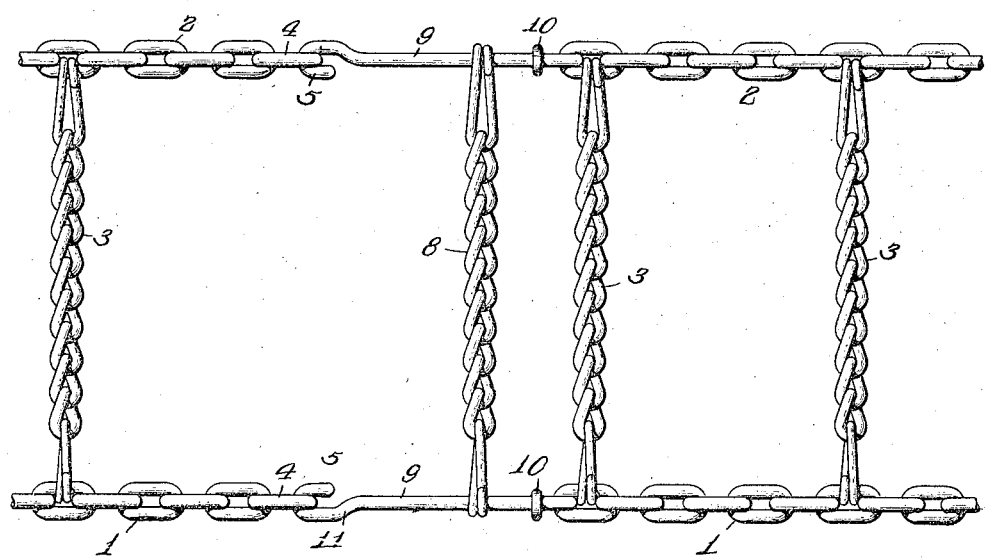

Other objects and certain advantages of the invention will in part be noted hereinafter in connection with the description of the accompanying drawing which illustrates a typical embodiment of the invention, and in which Figure 1 is a side elevational view of a form of the improved device when mounted in operative position; and Fig. 2 is a fragmentary plan view of the chain detached.

The anti-skid device, as shown, includes a pair of longitudinal side chains, 1, 2, connected at preferably equi-distant intervals by a plurality of cross chains 3. In practice the elements 3 are preferably spaced to insure the constant inter-position of at least one thereof between the road surface and the tire to increase the grip of the wheel when running. The flexible side members or longitudinal chains are constructed for interengagement, preferably at their extremities, in a manner shown for illustrative purposes as comprising eyes 4, and hooks 5. The several cross members and side members are so constructed and of such dimension, as to permit their free encirclement about a vehicle tire 6 with the longitudinal chains 1, 2, disposed substantially adjacent the wheel rim 7.

For the purposes of this invention the device may further comprise what may be termed an auxiliary cross chain 8 interconnecting the side chains and constructed and assembled on the latter in a manner which affords it a limited freedom of longitudinal movement with respect to the meeting ends of the side elements. In the typical construction illustrated, corresponding extremities of the side chains are constituted by rod links 9 of a length approximating the dimension of spacing between the fixed cross members 3. The rod links 9 at one end are permanently joined to the corresponding side chains, and at the other ends are bent to provide the hooks 5 for interconnection with the corresponding opposite terminal links on the side chains. From the points of their permanent connection, the rod links 9 are eccentrically curved with relation to the circular shape of the side members assumed on application to the tire, as shown in Fig. 1. This eccentricity is preferably of a maximum toward the periphery of the tire at a point adjacent the permanent connection of the rod links to the side members, and from thence decreases. Accordingly the auxiliary cross chain 8, in the position shown in Fig. 1, just after assembling, is relatively loose, and, as its ends slide along the eccentric portions of the links, it becomes gradually tautened until it reaches the desired final position which it normally retains. This movement of the auxiliary cross chain is limited at one point by the collars 10 carried by the links adjacent the fixed extremities thereof, and at a second point by shoulders 11 at the hooked ends of links 5.

The chains are applied to the wheels by wrapping the same about the tires and interlocking the ends of the side members. In this operation the chains are positioned initially with the auxiliary cross member 8 in the rear of the point of contact between the tire periphery and its supporting surface, that is the ground, and adjacent the collars 10, so that the space between the auxiliary chain and the terminal cross chain on the other extremities of the side members may be greater than the arc of contact or close adjacency between the tire and its supporting surface. This increased spacing at the point mentioned permits ready interengagement of the ends of the longitudinal side chains. It will thus be seen that due to the curved form of the rod links 9, and to the collars 10 which hold the rod links spaced from the sides of the tire, the auxiliary chain 8 hangs loose with respect to the tire and is free for automatic sliding movement on the rod links toward the interlocked uniting ends of the side chains in a direction reverse to the forward rotation of the wheel. Thereupon, upon forward rotation of the wheels when the vehicle is propelled, the auxiliary cross chain will easily creep, more or less promptly, toward the meeting ends of the side chains to assume a relatively tightened grip about the tire at the intermediate position between the fixed terminal cross chains and thus become symmetrically disposed with respect to the other cross members. The shoulders 11 formed on links 9 by the hooked ends serve to limit the automatic creeping of the loose cross-chains to centered position. Therefore while the construction typically set forth enables application of the devices to the vehicle wheels without the delay and effort of elevating or rotating the latter, it will be apparent that in use the chain will assume its intended form of symmetrical disposal for efficient coaction of the various parts. At the same time the device as a unit is free to creep about the tire periphery.

It is to be further understood that my invention may be embodied efficiently in parts adapted for application to existing anti-skid devices, and that it may also be embodied in forms specifically different from the construction illustrated, while possessing the structural superiority and functional advantages indicated.

Having described my invention, what I claim as new and desire to secure by Letters Patent is:

1. In a tire chain, or the like, the combination with a pair of side members connected by spaced cross members at fixed intervals and having interengageable parts whereby the whole is adapted to encircle the tire, of a cross member connecting said side members adjacent their meeting parts and constructed to have limited free longitudinal movement with respect thereto, whereby the longitudinal space between cross members adjacent only the meeting parts of said side members may be increased to facilitate mounting the chain.

2. In a tire chain, or the like, the combination with a pair of flexible side members interconnected by a plurality of relatively fixed cross members, and having interengageable extremities whereby the whole is adapted to encircle a tire, of an auxiliary cross member connecting said side members adjacent their uniting extremities and constructed to have a limited free movement toward and from said uniting extremities.

3. In a tire chain, or the like, the combination with a pair of longitudinal side members interconnected by a plurality of relatively fixed cross members, of a pair of terminal links for said side members constructed in a manner whereby the latter interlock at their extremities, and an auxiliary cross member mounted on said links for relative longitudinal movement with respect thereto, the connection between said links and said auxiliary member being constructed and arranged so that the latter varies in looseness with respect to the tire periphery as it moves longitudinally.

4. In a tire chain, or the like, the combination with a pair of side members to encircle a tire adjacent a rim, and having relatively fixed cross members to overlie the tire periphery, of a pair of links adjacent one end of said side members, said links being curved outwardly, a cross member connecting said links and mounted thereon for relative longitudinal movement and resultant variation of tightness with respect to the tire, and means to interconnect the extremities of the side members at a point between said auxiliary cross member and the opposite fixed cross member.

5. The combination with a tired wheel, of an anti-skid device therefor including a pair of side chains interconnected by a plurality of cross chains so fixed thereto that the spaced interval between said cross chains at the tread of the tire shall be less than the circumferential arc of the tire in close proximity to its supporting surface, said side chains having interengageable extremities and the fixed terminal cross chains being spaced from the uniting extremities of said side chains sufficiently to provide a clear space greater than the circumferential arc of the tire in close proximity to its supporting surface, and an auxiliary slidably mounted cross chain connecting said side chains intermediate the terminal fixed cross chains, said device being mounted so that said auxiliary cross chain is movable toward the uniting extremities of said side chains in a direction reverse to the forward rotation of the wheel.

6. The combination with a tired vehicle wheel, of an anti-skid device therefor including a pair of side chains interconnected by a plurality of cross chains so fixed thereto that the spaced intervals between said cross chains at the tread of the tire shall be less than the circumferential arc of the tire in close proximity to its supporting surface, said side chains having interengageable extremities, and the fixed terminal cross chains being spaced from the uniting extremities of said side chains sufficiently to provide a clear space greater than the circumferential arc of the tire in close proximity to its supporting surface, and an auxiliary cross chain mounted for limited longitudinal movement relative to said side chains and positioned between the terminal fixed cross chains, the connection between said side chains and said auxiliary cross chain being so constructed and arranged that the latter, when moved away from the uniting ends of said side chains assumes relative looseness and when moved oppositely assumes relative tightness with respect to the tire, said device being also adapted for creeping about the tire when the vehicle is in running operation.

7. A tire chain section comprising a pair of side members constructed for connection with the side members of a tire chain and a cross member mounted upon said side members of the section for slidable movement thereupon, and stops adjacent the ends of the said section side members to limit said slidable movement.

8. The combination in an anti-skid tire chain including a pair of side members having inter-engageable extremities and a plurality of cross-connecting members fixedly attached thereto at substantially equidistant intervals, said parts being constructed to encircle the tire periphery, of a cross-connecting member adjacent one of said extremities so constructed and attached to said side members as to be relatively movable thereover away from said extremities for mounting and toward said extremities to substantially midway between adjacent fixed cross members in operation, and stops upon said side members positioned to limit the movement of said movable cross member thereupon.

9. In an anti-skid tire chain, in combination, a pair of side members having inter-engageable extremities, a plurality of cross-connecting members fixedly attached thereto at substantially equidistant intervals, corresponding portions of said side members adjacent said extremities comprising relatively smooth rods, and a cross-connecting member so constructed and attached to said rods as to be relatively slidable therealong away from said extremities for mounting and toward said extremities in operation, and stops upon said side members positioned to limit the movement of said movable cross member thereupon.

10. In an anti-skid tire chain, in combination, a pair of flexible side members having inter-engageable extremities, a plurality of cross-connecting members fixedly attached thereto at substantially equidistant intervals, corresponding portions of said side members adjacent said extremities comprising outwardly bowed rods, a cross-connecting member so constructed and attached to said rods as to be readily slidable therealong away from said extremities to assume relative looseness about the tire and toward said extremities to assume relative tightness about the tire, said parts constituting a unitary device adapted for creeping about the tire in operation, and stops upon said side members positioned to limit the movement of said movable cross member thereupon.

11. A unitary tire chain constructed and arranged for mounting about the periphery of a tired vehicle wheel while the latter is at rest and in contact with the road, said chain including a plurality of cross chains having substantially equal circumferential spaces therebetween less than the circumferential periphery of the tire in close proximity to the road, one of said cross chains being constructed and arranged for such circumferential movement relative to its adjacent cross chains that the circumferential space between two of said cross chains may be made greater than the circumferential periphery of the tire in close proximity to the road, and means for supporting said cross chains about the tire and for permitting said relatively movable member to assume and maintain, in operation, substantially equal spaced relation to the others.

12. A tire chain adapted to be mounted about the periphery of a tired wheel while said wheel is at rest and in contact with a supporting surface, the said tire chain being provided with a cross member so connected therewith as to permit displacement from its normal position for mounting of the chain upon the tire while so at rest and in contact with a supporting surface and automatic return to such normal position while the wheel is running.

In testimony whereof I affix my signature, in the presence of two witnesses.

WALTER L. SMITH.

Witnesses:
 F. P. WARFIELD,
 C. J. KULBERG.